UNITED STATES PATENT OFFICE.

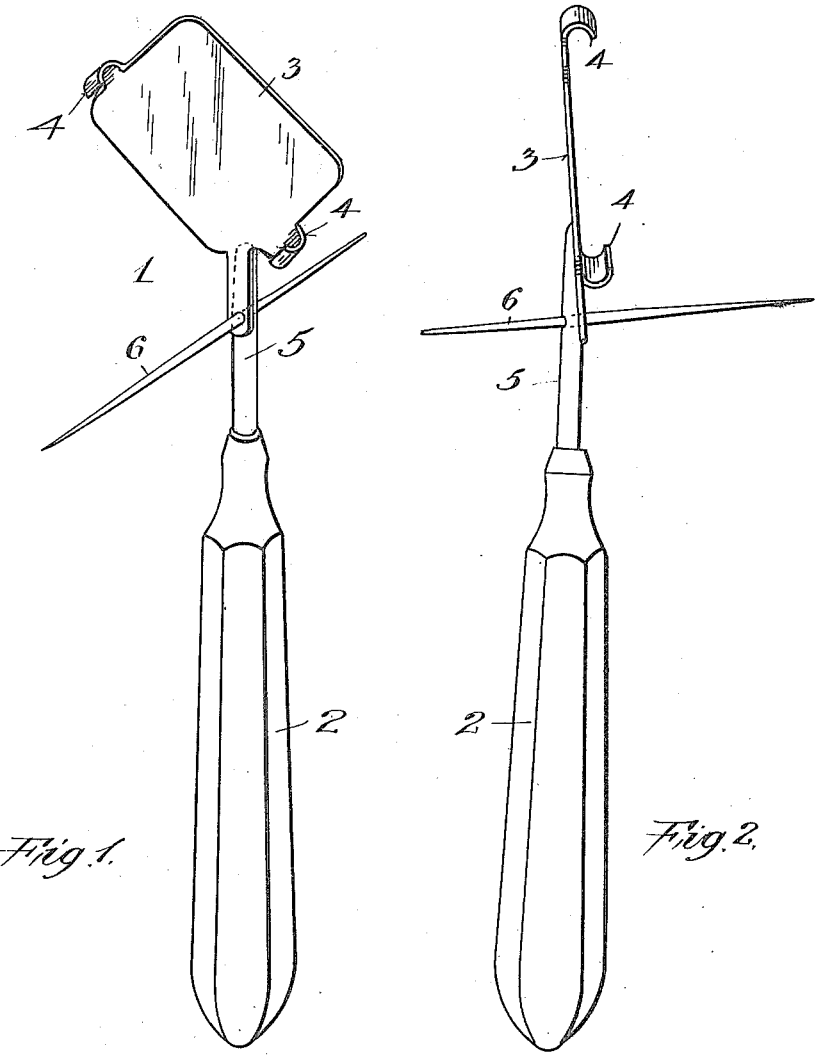
H. F. WAITE.
DENTAL FILM HOLDER.
APPLICATION FILED APR. 24, 1916.
1,229,553.
Patented June 12, 1917.

HARRY F. WAITE, OF WHITESTONE LANDING, NEW YORK.

DENTAL FILM-HOLDER.

1,229,553.

Specification of Letters Patent.

Patented June 12, 1917.

Application filed April 24, 1916. Serial No. 93,346.

*To all whom it may concern:*

Be it known that I, HARRY F. WAITE, a citizen of the United States, and a resident of Whitestone Landing, county of Queens, and State of New York, have invented a new and useful Improvement in Dental Film-Holders, of which the following is a specification.

The object of my invention is to provide a suitable holder which may be placed in the mouth of a patient, and on this holder is a suitable indicator to indicate the direction in which the rays should pass in order to make a proper radiograph of the portion of the jaw which is under consideration. This, and other objects are accomplished by my invention, one embodiment of which is hereinafter more particularly set forth.

For a more particular description of my invention, reference is to be had to the accompanying drawings, forming a part hereof, in which, Figure 1 is a perspective view of my improved film holder.

Fig. 2 is an end view of the same.

Throughout the various views of the drawings, similar reference characters designate similar parts.

My improved film holder 1, may or may not be provided with a handle 2, as desired. It is essential, however, that it be provided with a plate 3 provided with means for holding the film in place, as clips 4, which are preferably located at each end, and in the stem 5 which extends from the plate holder 3 and is secured to the handle 2, when a handle is employed, is a suitable perforation through which may be inserted a round orange stick 6 which, when in place, will be substantially perpendicular to the plane of the plate holder 3. The function of the orange stick is to act as an indicator to show the direction in which the X-rays should be thrown to properly make the desired radiograph.

In view of the foregoing, the use of my improved film holder will be readily understood. A film is placed in its proper casing and put in the usual manner on the holder 3 and held by the clips 4, or other securing means. A fresh stick is then inserted and the apparatus applied to the mouth of the patient, either with the aid of the handle or, if the handle is removed, in any other suitable way, and then the indicator indicates the direction in which the rays should be applied, as above set forth. After the radiograph has been taken, in the usual manner, the stick 6 may be removed and thrown away, and the remainder of the holder may be cleansed and made ready for its next use.

While I have shown and described one embodiment of my invention, it is obvious that it is not restricted thereto, but is broad enough to cover all structures which come within the scope of the annexed claim.

Having thus described my invention, what I claim is:

In a device of the class described, a film holder having a part adapted to hold a film, a perforated shank extending therefrom with the axis of the perforation substantially perpendicular to the plane of the plate held by the film holder, and a stick inserted in said perforation whereby the direction in which rays should be thrown on the film in the film holder is indicated.

HARRY F. WAITE.